United States Patent [19]

Tabata et al.

[11] Patent Number: 5,407,738
[45] Date of Patent: Apr. 18, 1995

[54] MINUTE STRUCTURE FOR SHOWING COLORS BY REFLECTION AND INTERFERENCE OF NATURAL LIGHT

[75] Inventors: Hiroshi Tabata, Yokohama; Kinya Kumazawa; Junichi Takimoto, both of Yokosuka, Japan

[73] Assignee: Nissan Motor Co., Ltd., Yokohama, Japan

[21] Appl. No.: 79,426

[22] Filed: Jun. 21, 1993

[30] Foreign Application Priority Data

Jun. 30, 1992 [JP] Japan .................................. 4-172926

[51] Int. Cl.$^6$ .............................................. B32B 9/00
[52] U.S. Cl. ...................................... 428/229; 428/38; 428/224
[58] Field of Search ........................... 428/229, 38, 224

[56] References Cited

U.S. PATENT DOCUMENTS 4,514,459 4/1993 Nakagawa et al. .

FOREIGN PATENT DOCUMENTS 59-228042 12/1984 Japan .
60-24847 6/1985 Japan .

OTHER PUBLICATIONS

Seni Kikai Gakkaisi, vol. 41, No. 2, 1989, pp. T18-T26.

*Primary Examiner*—Patrick J. Ryan
*Assistant Examiner*—Kam F. Lee
*Attorney, Agent, or Firm*—Lowe, Price, LeBlanc & Becker

[57] ABSTRACT

A minute structure for showing colors by reflection and interference of natural light includes a plurality of fin portions and a central portion for uniting the fin portions. The fin portions are aligned in a first direction and positioned such that the adjacent fin portions are spaced from each other so as to define therebetween a void space which is filled with air. Each fin portion has a first width defined in a second direction which is perpendicular to the first direction and a second width defined in the first direction. The void space has a third width which is defined in the first direction. The central portion has a fourth width defined in the second direction. The first width of each fin portion is three times or more larger than the fourth width of the central portion. The third width of the void space ranges from 0.02 μm to 0.4 μm. The second width of each fin portion is not less than 0.02 μm. A refractive index of each fin portion ranges from 1.2 to 1.8. A maximum production error from a standard value with respect to the second width of each fin portion is not larger than 40%. Thus, the minute structure reflects ultraviolet rays and infrared rays and shows, for example, a bluish purple tint or a bluish green tint by reflection and interference of visible light rays.

10 Claims, 9 Drawing Sheets

MINUTE STRUCTURE FOR SHOWING COLORS BY REFLECTION AND INTERFERENCE OF NATURAL LIGHT

BACKGROUND OF THE INVENTION

1. Field of the Invention

The present invention relates to a minute structure for showing colors by reflection and interference of natural light, which is used as fibers and chips for textiles and coatings.

2. Description of the Prior Art

In the field of coating for automobiles, aluminum powder has been proposed to show metallic color. Besides, mica chips or carbon fiber chips have been proposed to be used with a pigment, thereby showing, for example, pearlescent color. However, when the pigment is deteriorated by ultraviolet rays or infrared rays, tone of the coating is substantially damaged.

In view of this, there are some proposals concerning materials for showing colors by using interference of light. For example, SENI KIKAI GAKKAISI, Vol. 42, No. 2 (1989) discloses a laminated photo-controllable coloring film for showing colors by interference of light. This film is composed of one layer of molecular orientation anisotropic polymer film and two layers of polarizing films, or one polarizing film and one reflective film. However, it is difficult to form thin fibers or minute chips from this film and to control a dominant wavelength of a reflecting light.

JP-A-59-228042 and U.S. Pat. No. 4,514,459 disclose flat fibers of a woven fabric. These publications defines, for example, a cross sectional configuration of the flat fibers and the angle of inclination of the flat fibers relative to the surface of the fabric at portions other than formation points of the fabric. However, these publications fail to disclose, for example, a detailed cross sectional configuration of the flat fibers and refractive index of the same. Therefore, it is difficult to produce the fibers in an industrial scale. As another way to show colors by reflection and interference of light, it is theoretically possible to closely pack latex particles having a uniform particle size. However, it is difficult to fix the latex particles at certain predetermined positions. If the latex particles are displaced from the predetermined positions, desired colors can not be obtained.

SUMMARY OF THE INVENTION

It is therefore an object of the present invention to provide a minute structure for showing colors by reflection and interference of natural light, which is free of the above-mentioned drawbacks.

According to the present invention, there is provided a minute structure for showing colors by reflection and interference of natural light, said structure including a minute unit comprising:

a plurality of fin portions aligned in a first direction and positioned such that the adjacent fin portions are spaced from each other so as to define therebetween a void space which is filled with air, each fin portion having a first width defined in a second direction which is perpendicular to the first direction and a second width defined in the first direction, the void space having a third width which is defined in the first direction; and a central portion for uniting said fin portions, said central portion having a fourth width defined in the second direction, in which the first width of each fin portion is three times or more larger than the fourth width of said central portion, in which the third width of the void space ranges from 0.02 μm to 0.4 μm, in which the second width of each fin portion is not less than 0.02 μm, in which a refractive index of each fin portion ranges from 1.2 to 1.8, and in which a maximum production error from a standard value with respect to the second width of each fin portion is not larger than 40%.

A minute structure according to the present invention has a function to reflect ultraviolet rays and infrared rays. Therefore, it is durable against ultraviolet rays and infrared rays. Furthermore, it can easily be formed into thin fibers and minute chips by using a substantially transparent organic material such as polyester, polyacrylonitrile or polystyrene.

A minute structure according to the present invention shows, for example, a bluish purple tint or a bluish green tint, which varies with a change of point of view by reflection and interference of visible light rays.

DESCRIPTION OF THE PREFERRED INVENTION

With reference to FIGS. 1–30, a minute structure for showing colors by reflection and interference of natural light in accordance with the present invention will be described in the following.

Figure 1:
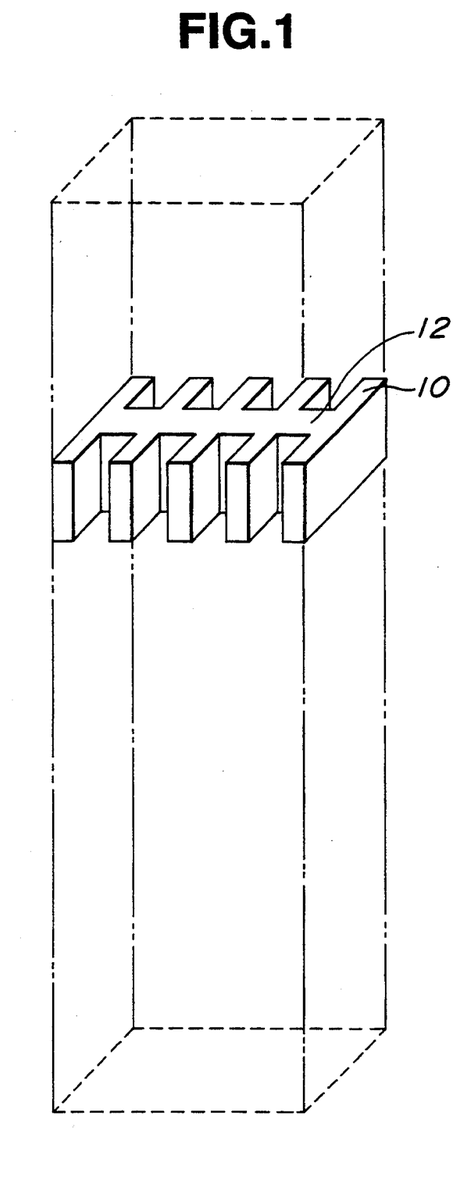
FIG. 1 is a perspective view of a prismatic fiber in which a minute structure according to a first embodiment of the present invention is partially shown.

As is seen from FIG. 1, there is provided a prismatic fiber in which a minute structure according to a first embodiment of the present invention is partially shown. However, the minute structure may be formed into minute chips, too. As is seen from FIGS. 1 and 2, the minute structure comprises a plurality of fin portions 10 (five fin portions in this embodiment) and a central portion 12 uniting the fin portions 10. Defined between two adjacent fin portions is a void space 14 which is filled with air. A direction in which fin portions 10 are aligned is referred to as a first direction, and a direction which is perpendicular to the first direction is referred to as a second direction. As is seen from FIG. 2, the thickness of the central portion 12, which is defined in the second direction, is referred to as "Wa", the length of the fin portion 10, which is defined in the second direction, is referred to as "Wb", the thickness of the void space 14, which is defined in the first direction, is referred to as "da", the thickness of each fin portion 10, which is defined in the first direction, is referred to as "db", refractive index of the void space 14 (air) is referred to as "na", and refractive index of the fin portion 10 is referred to as "nb".

Figure 2:
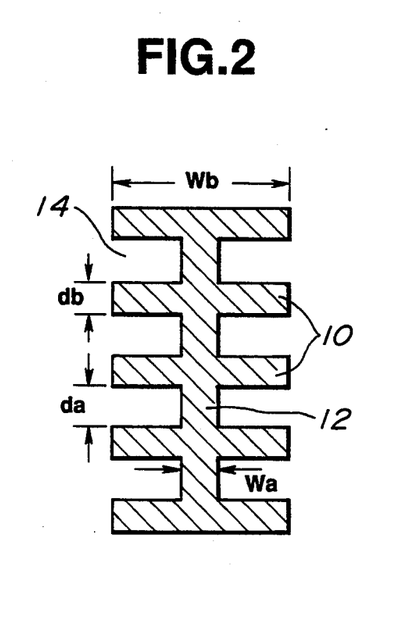
FIG. 2 is a sectional view of the minute structure according to the first embodiment.

As is seen from FIG. 2, a minute structure of the first embodiment has a section which is rectangular in shape, and thus has constant values with respect to "Wa", "Wb", "da" and "db", respectively. However, as is clarified hereinafter, a minute structure according to the present invention may take different values with respect to "Wa", "Wb", "da" and "db", respectively.

Figure 3:
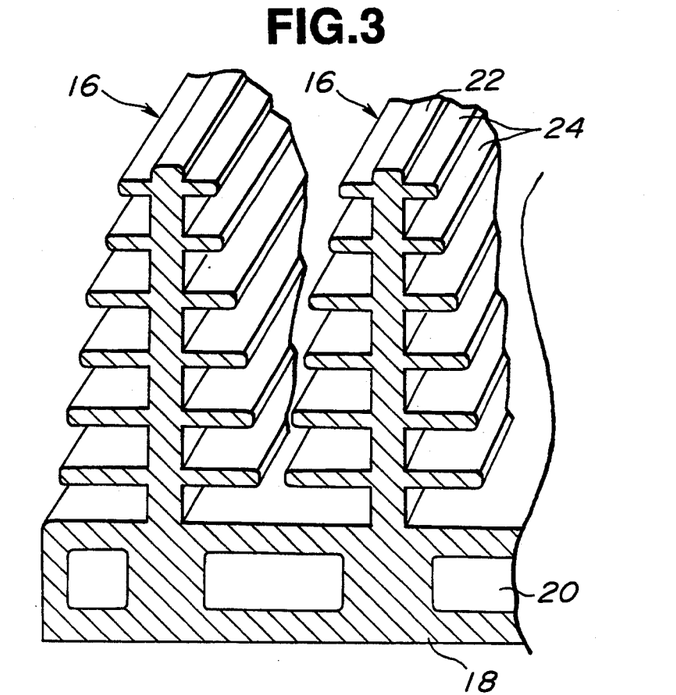
FIG. 3 is a perspective view showing a minute structure according to a second embodiment of the present invention.
Figure 4:
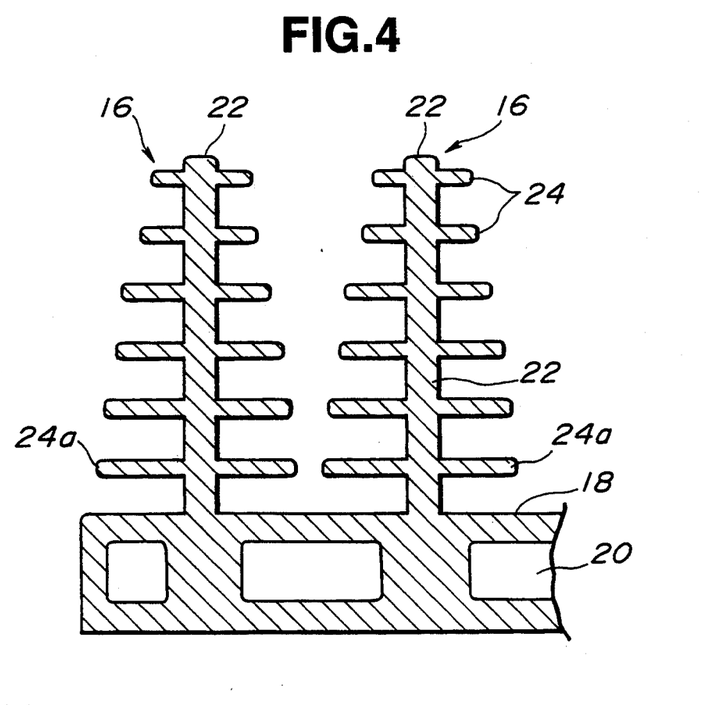
FIG. 4 is a sectional view showing the minute structure according to the second embodiment.
Figure 5:
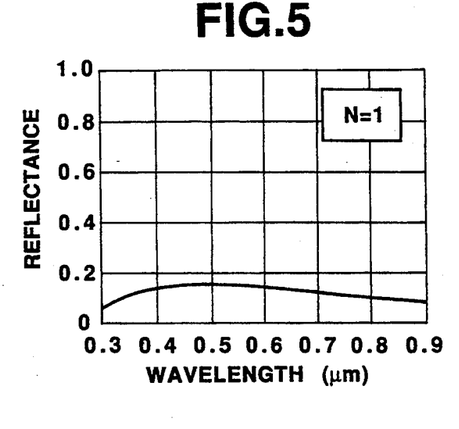
FIGS. 5 to 10 are graphs showing the effect of number (N) of fin portions of the minute structure on reflectance.
Figure 6:
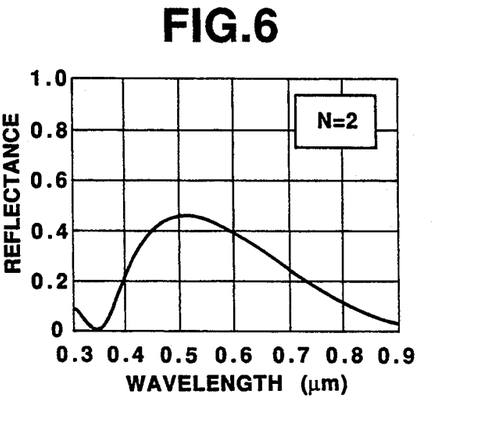
Figure 7:
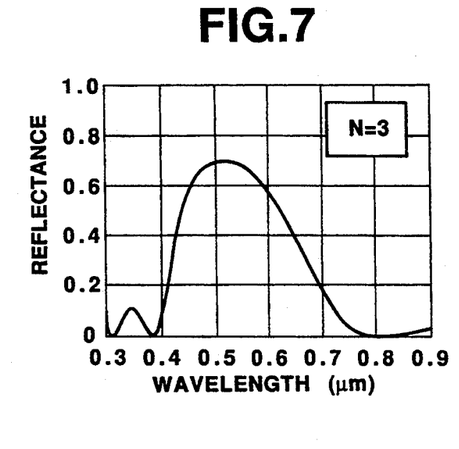
Figure 8:
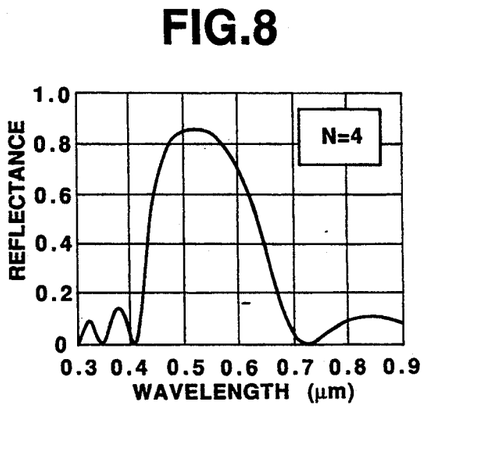
Figure 9:
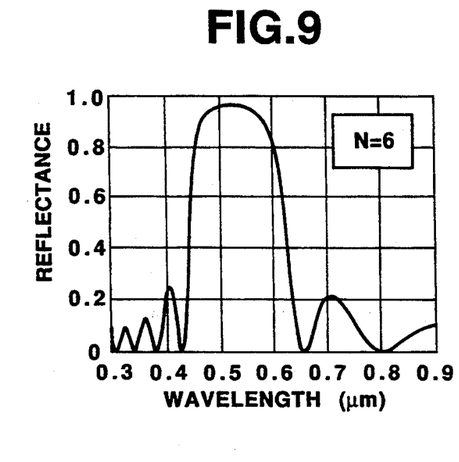
Figure 10:
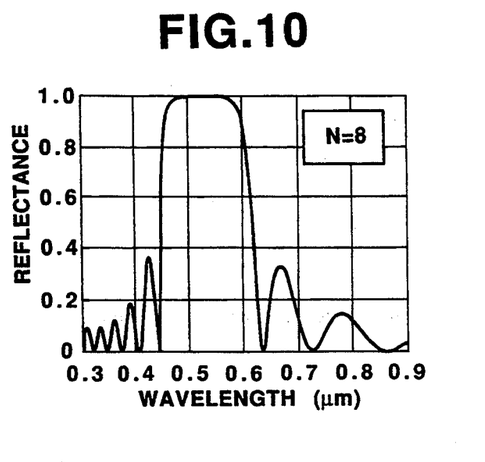
Figure 11:
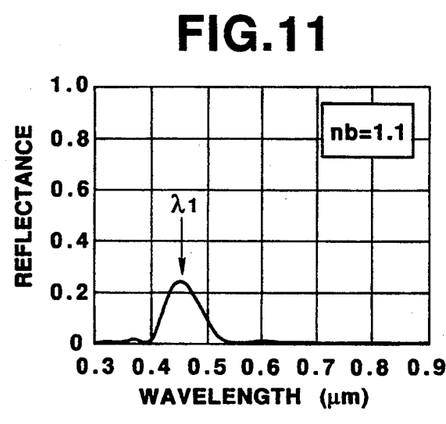
FIGS. 11 to 15 are graphs showing the effect of refractive index (nb) of the minute structure having six fin portions on reflectance.
Figure 12:
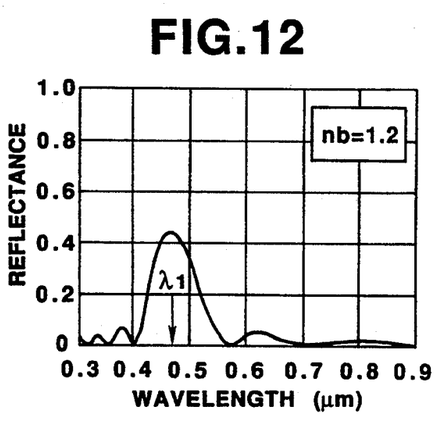
Figure 13:
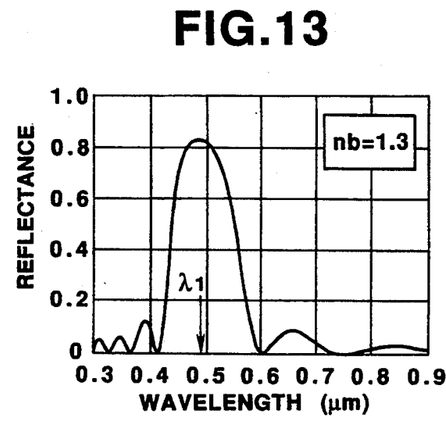
Figure 14:
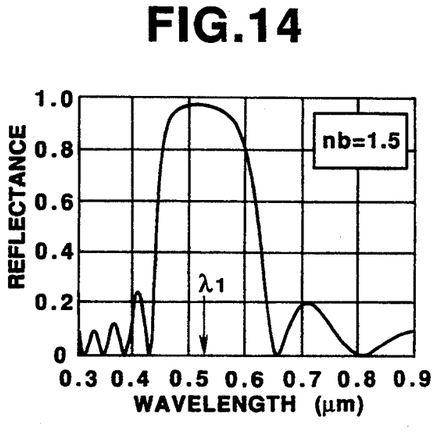
Figure 15:
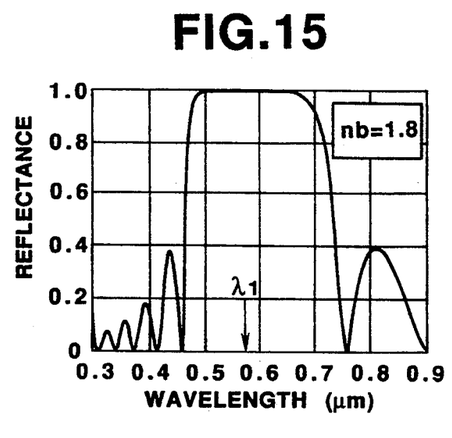
Figure 16:
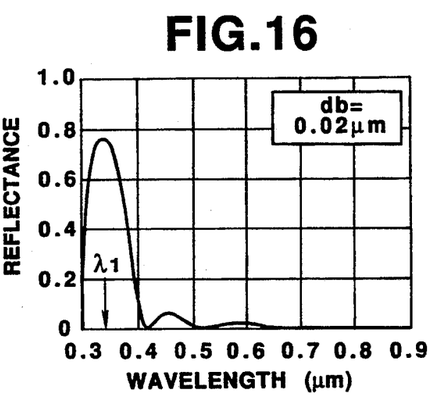
FIGS. 16 to 21 are graphs showing the effect of thickness (db) of the fin portions of the minute structure on reflectance.
Figure 17:
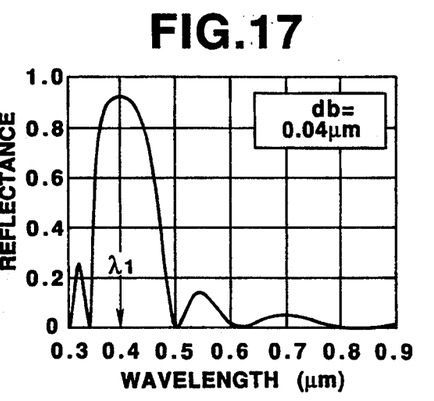
Figure 18:
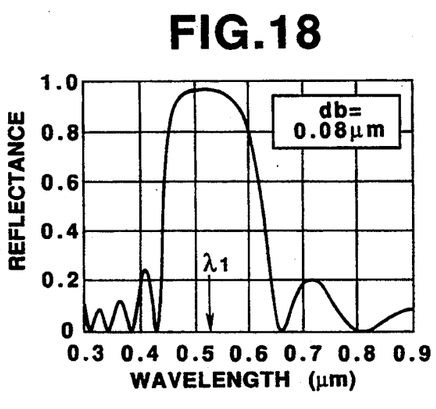
Figure 19:
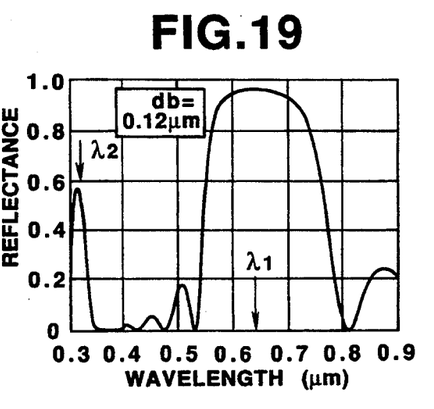
Figure 20:
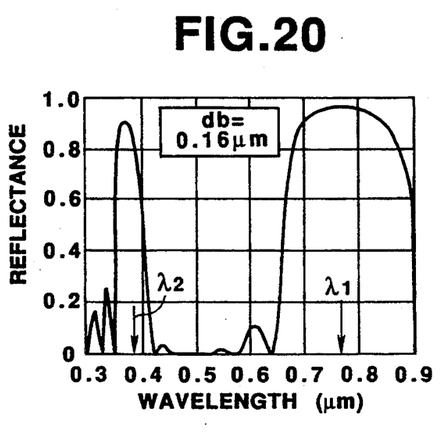
Figure 21:
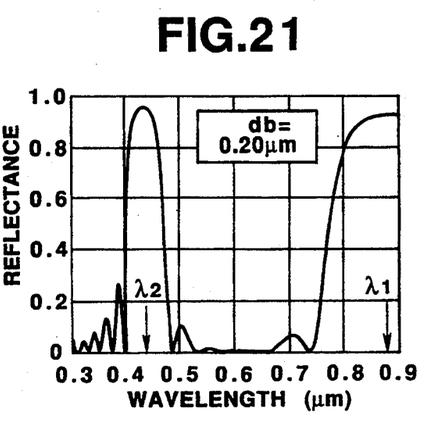

With reference to FIGS. 3 and 4, there is provided a minute structure according to a second embodiment of the present invention. The minute structure comprises a plurality of minute units 16 (only two units are shown in this embodiment) and a base portion 18. Formed in the base portion is a plurality of void spaces 20. Due to the provision of the void spaces 20, the shape of the minute structure can be maintained as designed. Each unit 16 has a central portion 22 and a plurality of fin portions 24 (six fin portions in this embodiment). Unlike the minute structure of the first embodiment, the length of fin portion 10, "Wb", decreases as the distance between the base portion 18 and the fin portion 24 increases, as illustrated. Due to this configuration, light tends to reach the base portion 18. However, each "Wb" may take the same value in this embodiment.

According to the present invention, it is preferable that "Wb" is longer than one wavelength of an objective wavelength. It is preferable that the two adjacent longest fin portions 24a of the two adjacent units 16 are spaced from each other and that the distance between two central axes of the two adjacent central portions 22 is from about 0.7 μm to about 1.5 μm.

FIGS. 5 to 10 show the effect of the number (N) of the fin portions of the minute structure on reflectance. FIGS. 5 to 10 correspond to one, two, three, four, six and eight fin portions, respectively. For example, the above-mentioned minute structures of the first and second embodiments have five and six fin portions, respectively. As is seen from FIG. 5, in case of one fin portion, reflectance is relatively low, thereby not showing a specific clear color. As is seen from FIG. 6, in case of two fin portions, there is provided a high reflectance at a wavelength of around 0.5 μm, thereby showing a specific clear color (bluish green). Therefore, it is understood that not less than two fin portions are necessary in the present invention to get sufficient reflectance and interference of natural light. With reference to FIGS. 6 to 10, it is understood that reflectance at around 0.5 μm tends to become higher by increasing the number (N) of the fin portion. That is, the minute structure shows colors (bluish green) more clearly by increasing the number of the fin portion.

FIGS. 11 to 15 show the effect of refractive index (nb) of the minute structure having six fin portions on reflectance. As is seen from FIG. 11, in case that "nb" is 1.1, reflectance at the center wavelength "λ1" is lower than 0.3. As is seen from FIG. 12, in case that "nb" is 1.2, reflectance at the center wavelength "λ1" is higher than 0.4. As is seen from FIGS. 12 to 15, reflectance at the center wavelength "λ1" increases by increasing "nb". That is, the minute structure shows colors more clearly by increasing "nb". It is generally said that color is not sufficiently clearly shown if reflectance is lower than 0.3. Therefore, it is necessary in the present invention that a minute structure has a refractive index (nb) of not lower than 1.2.

A transparent and colorless organic material having a refractive index higher than 1.8 does not exist. Some of colored and opaque organic materials have a refractive index higher than 1.8. However, in this case, it becomes difficult to show colors by reflectance and interference of light due to absorption of light. Some of inorganic materials have a refractive index higher than 1.8. However, it is not preferable to use inorganic materials for the minute structure because it is difficult to accurately form the minute structure. Thus, a transparent or substantially transparent organic material so as to enable reflectance and interference of light, which has a refractive index ranging from 1.2 to 1.8, is used in the present invention. For example, polyester, polyacrylonitrile, polystyrene or the like is used for the minute structure material.

FIGS. 16 to 21 show the effect of thickness (db) of the fin portion on reflectance. It should be noted that sunshine ultraviolet rays contain relatively more ultraviolet rays having a wavelength ranging from about 0.32 to about 0.4 μm, i.e. ultraviolet rays A wave range, than ultraviolet rays B wave range and ultraviolet rays C wave range. As is seen from FIG. 16, in case that "db" is about 0.02 μm and refractive index is about 1.5, ultraviolet rays at the ultraviolet rays A wave range is sufficiently reflected by the minute structure. If "db" becomes thinner than 0.02 μm, ultraviolet rays at the ultraviolet rays A wave range can not be sufficiently reflected. Therefore, it is necessary in the present invention that "db" is not less than 0.02 μm. As is seen from FIGS. 20 and 21, in case that "db" is not less than 0.16 μm, the minute structure has a high reflectance at infrared rays range (not less than 0.7 82 m).

Figure 22:
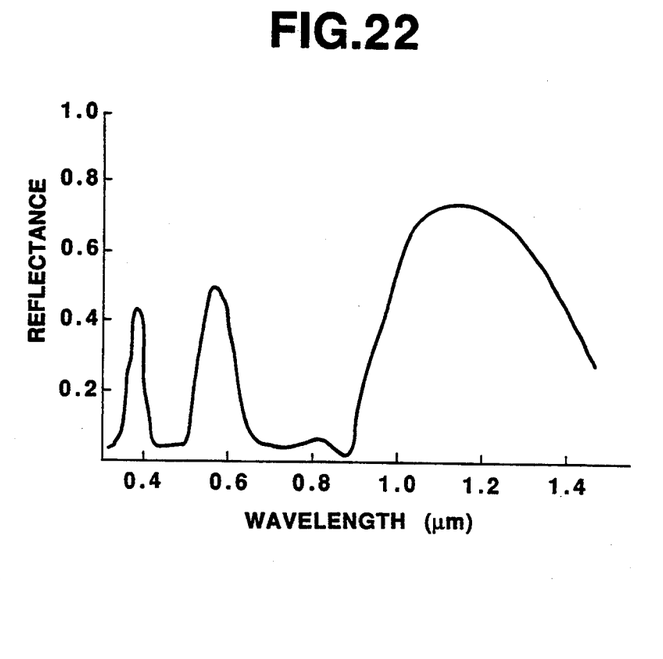
FIG. 22 is a graph showing a relation between wavelength and reflectance of the minute structure having four fin portions and a refractive index of 1.5.

FIG. 22 shows a change of reflectance over wavelengths with respect to a minute structure in which the number of fin portions is four, the thickness, "da", is 0.35 μm, the thickness, "db" is 0.15 μm and refractive index of fin portions, "nb", is 1.5. As is seen from FIG. 22, this minute structure shows three peaks of reflectance, i.e. at ultraviolet rays range (wavelengths of about 0.4 μm), at visible light range (wavelengths of about 0.6 μm) and at infrared rays range (wavelengths not lower than about 1.0 μm). The peak at infrared rays range is particularly high compared with those at ultraviolet rays range and visible light range. Therefore, deterioration of minute structure due to heat can effectively be prevented. If "da" is increased from 0.35 μm, the reflectance spectrum moves to the right in a graph, as compared with FIG. 22. Therefore, if "da" is too large, a sufficient reflectance at visible light range can not be obtained. Thus, it is necessary in the present invention that "da" is not larger than about 0.4 μm.

Figure 23:
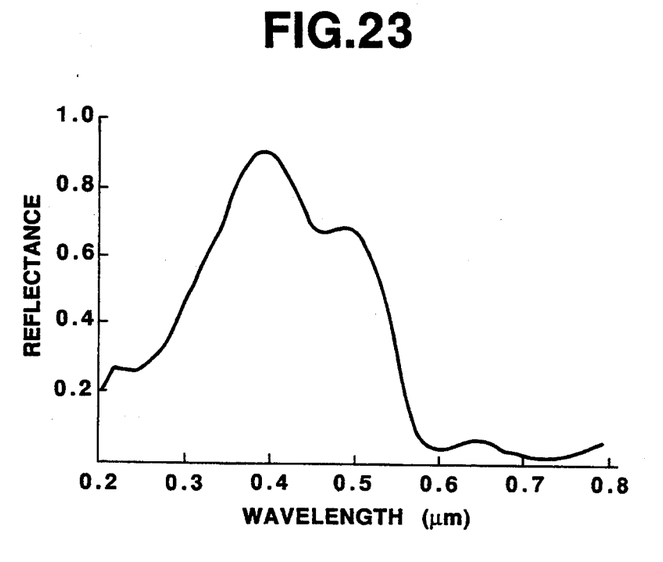
FIG. 23 is a graph showing a relation between wavelength and reflectance of the minute structure having seven fin portions and a refractive index of 1.5.

FIG. 23 shows a change of reflectance over wavelengths with respect to a minute structure having seven fin portions and a refractive index (nb) of 1.5. In this minute structure, "da" is 0.13 μm and "db" is 0.06 μm with respect to the four fin portions counted from the incident side of natural light, and "da" is 0.09 μm and "db" is 0.05 μm with respect to the remaining three fin portions. As is seen from FIG. 23, it is understood that this minute structure has a high reflectance at ultraviolet rays range and visible light range.

Figure 24:
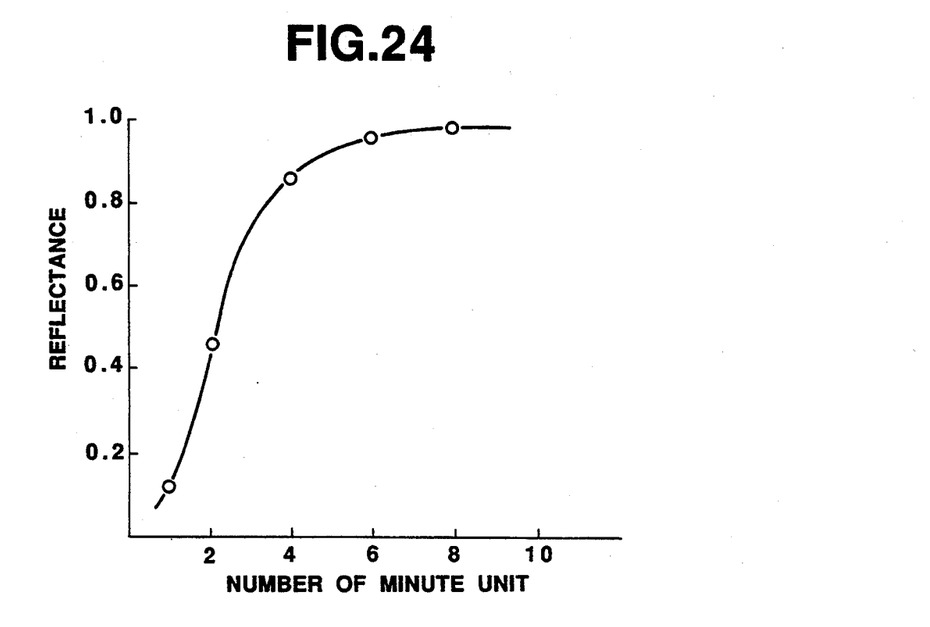
FIG. 24 is a graph showing the effect of the number of minute units of the minute structure on reflectance.

FIG. 24 show the effect of the number of the minute unit on reflectance with respect to light having a wavelength of 0.48 μm, an incident angle of 0 degree and an reflected light receiving angle of 0 degree. In this case, the minute units are aligned in a direction of X axis which is defined along a horizontal direction of FIG. 4. As is seen from FIG. 24, it is preferable that not less than two units of the minute structure are aligned in a direction of X axis in order to enable reflectance and interference of visible light and reflectance at ultraviolet rays range and infrared rays range. In this regard, the minute structure of the second embodiment (FIGS. 3 and 4) is preferable. A minute structure having only one unit is inferior in optical function as compared with a minute structure having a plurality of units. However, this disadvantage can be compensated, for example, through a measure taken in a weaving process.

Figure 25:
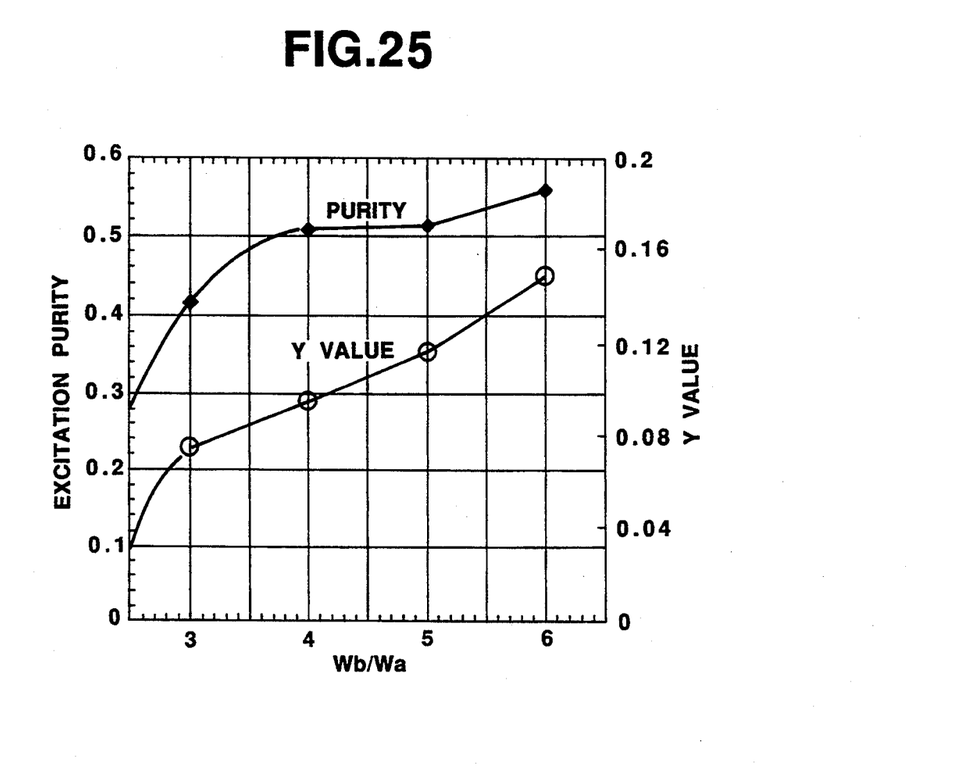
FIG. 25 is a graph showing the effects of the ratio of length (Wb) of the fin portion to thickness (Wa) of a central portion on excitation purity and on Y value, respectively.
Figure 26:
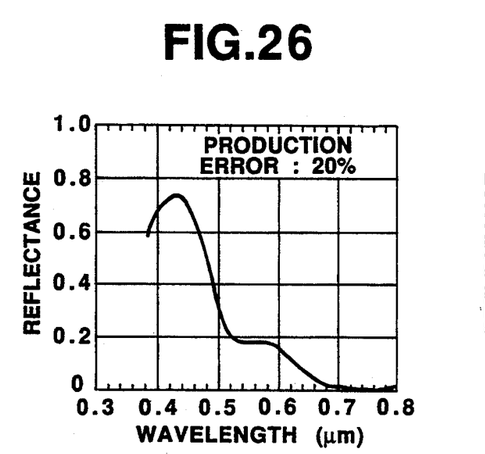
FIGS. 26 to 29 are graphs showing the effect of production errors of thickness (db) of the fin portion on reflectance.
Figure 27:
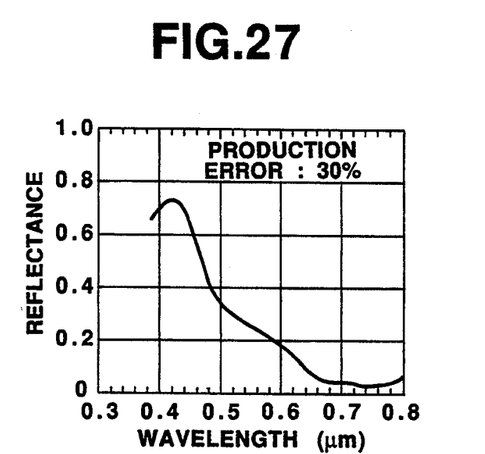
Figure 28:
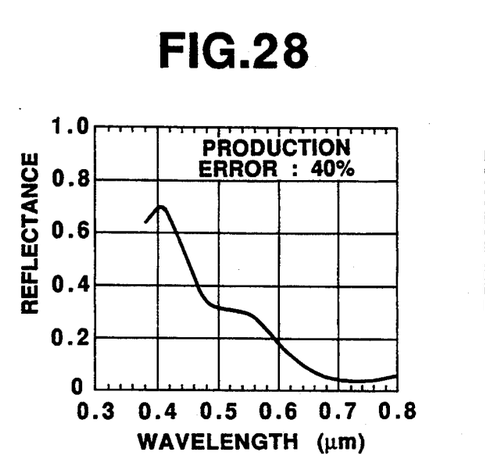
Figure 29:
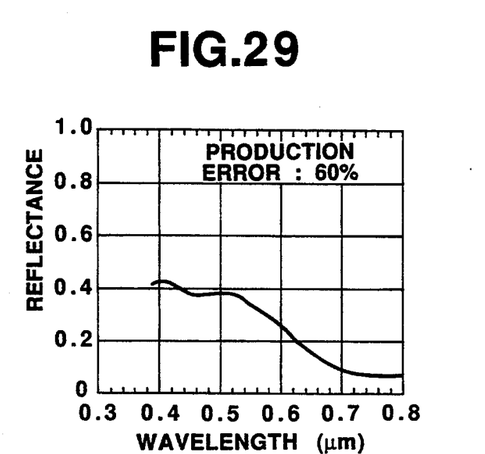

FIG. 25 shows a relation between excitation purity of a reflected color under a white light and the ratio of "Wb" to "Wa" (Wb/Wa) and another relation between Y value and Wb/Wa. When Wb/Wa is not less than 3, excitation purity is more than 0.4. If excitation purity is lower than 0.4, desired colors are not obtained. Therefore, according to the present invention, it is preferable that Wb/Wa is not less than 3.

Figure 30:
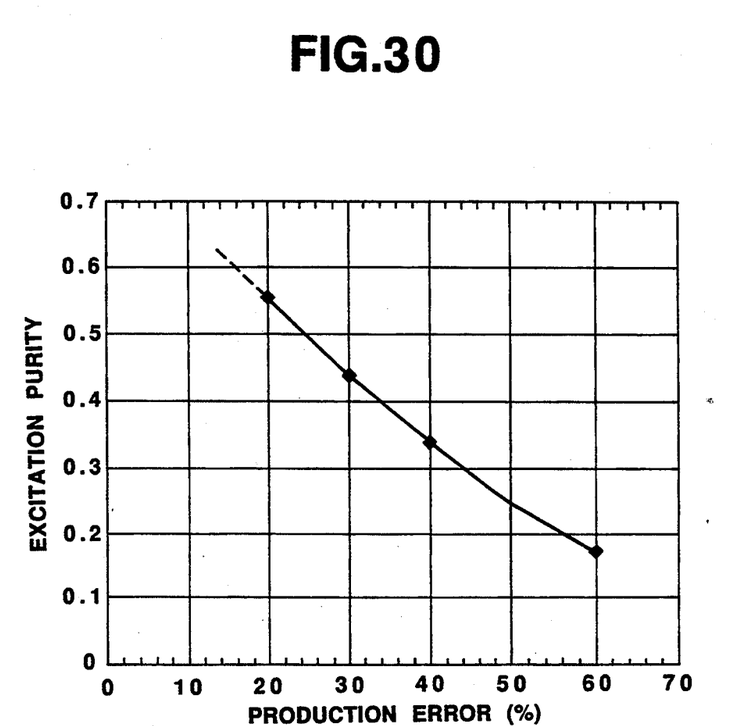
FIG. 30 is a graph showing the effect of production errors of thickness (db) of the fin portion on excitation purity.

FIGS. 26 to 29 show the effect of the maximum production errors, 20%, 30%, 40% and 60%, from the standard value of "db" on reflectance, respectively. If there is a certain production error of "db", "da" also deviates from the standard value, thereby altering reflection spectrum of natural light. When the production error is not larger than 40% (see FIG. 26 to 28), there is provided a specific peak reflectance at a certain wavelength. However, when the production error is 60% (see FIG. 29), the specific peak reflectance disappears. FIG. 30 shows a relation between the production error of "db" and excitation purity. It is understood that excitation purity decreases by increasing the production error of "db". In view of the results shown in FIGS. 26–30, in the present invention, it is necessary to make the production error of "db" not larger than 40%.

In the following, a method to form a minute structure according to the present invention will be described. It is preferable to use a double (core and sheath) melt spinning method to stably form the minute structure. A nozzle having a size which is about 900 times as that of the section of the minute structure is attached to a head for a double melt spinning. Polymers having different melting temperature or different solubility in solvent are used for the core and sheath. For example, melted polyethylene telephthalate having a temperature of about 300° C. and melted polystyrene having a temperature of about 230° C. are respectively used for the core and sheath. The core material and the sheath material are extruded at the same time from their respective extruders at a pressure ranging from about 600 to about 850 kg/cm². Then, the extruded core and sheath are passed through an air cooling layer having a length of 3 to 4 m. Then, the extruded core and sheath are drawn at a rate ranging from about 1000 to 1500 m/min so as to obtain the aimed size of the minute structure. Then, the sheath is removed by a solvent such as methyl ethyl ketone, ethyl acetate, benzole or triol, which has a high dissolving power against the sheath material, thereby obtain a minute structure according to the present invention, such as a thread having a diameter of, for example, about 10 μm. The thus obtained threads are twisted into a fiber, and the fiber is formed into fabric by spinning the same.

As another use of the minute structure, the thread is frozen and pulverized into minute chips each of which has three dimensions of about 10 μm X about 20 μm X about 30 μm. The minute chips can be mixed with a paint to form a clear coat of a vehicle body. It should be noted that even if the minute chips are mixed with the paint, the paint having a high viscosity does not penetrate into the void space of the minute structure.

What is claimed is:

1. A minute structure for showing colors by reflection and interference of natural light, said structure including a minute unit comprising:
   a plurality of fin portions aligned in a first direction and positioned such that the adjacent fin portions are spaced from each other so as to define therebetween a void space which is filled with air, each fin portion having a first width defined in a second direction which is perpendicular to the first direction and a second width defined in the first direction, the void space having a third width which is defined in the first direction; and
   a central portion for uniting said fin portions, said central portion having a fourth width defined in the second direction,
   in which the first width of each fin portion is three times or more larger than the fourth width of said central portion, in which the third width of the void space ranges from 0.02 μm to 0.4 μm, in which the second width of each fin portion is not less than 0.02 μm, in which a refractive index of each fin portion ranges from 1.2 to 1.8, and in which a maximum production error from a standard value with respect to the second width of each fin portion is not larger than 40%.

2. A minute structure according to claim 1, wherein said central portion is merged with a middle portion of each fin portion.

3. A minute structure according to claim 1, wherein said fin portions and said central portion are rectangular in shape.

4. A minute structure according to claim 1, wherein all of said fin portions have the first widths which are the same.

5. A minute structure according to claim 1, wherein said fin portions have the first widths which are different.

6. A minute structure according to claim 1, further comprising a base portion on which said minute unit is mounted.

7. A minute structure according to claim 6, further comprising another minute unit which is mounted on said base portion.

8. A minute structure according to claim 6, wherein length of said fin portion decreases as the distance between said base portion and said fin portion increases.

9. A minute structure according to claim 1, which is formed into a fabric for showing colors by reflectance and interference of natural light.

10. A minute structure according to claim 1, which is mixed with a paint to form a coating showing colors by reflectance and interference of natural light.

* * * * *